United States Patent
Polkovnikov

(10) Patent No.: US 9,405,583 B2
(45) Date of Patent: *Aug. 2, 2016

(54) RESOURCE PROVISIONING BASED ON LOGICAL PROFILES AND PIECEWISE OBJECTIVE FUNCTIONS

(71) Applicant: EMC Corporation, Hopkinton, MA (US)

(72) Inventor: Alexey Alexandrovich Polkovnikov, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/764,420

(22) PCT Filed: Oct. 14, 2013

(86) PCT No.: PCT/RU2013/000906
§ 371 (c)(1),
(2) Date: Jul. 29, 2015

(87) PCT Pub. No.: WO2015/057094
PCT Pub. Date: Apr. 23, 2015

(65) Prior Publication Data
US 2015/0355947 A1    Dec. 10, 2015

(51) Int. Cl.
*G06F 9/46* (2006.01)
*G06F 9/50* (2006.01)
*G06F 3/06* (2006.01)

(52) U.S. Cl.
CPC ............ *G06F 9/5011* (2013.01); *G06F 3/0631* (2013.01); *G06F 3/0685* (2013.01); *G06F 9/5027* (2013.01)

(58) Field of Classification Search
None
See application file for complete search history.

(56) References Cited

U.S. PATENT DOCUMENTS

| 7,139,741 | B1 * | 11/2006 | Benjamin ................ G06N 5/04 706/45 |
| 7,904,652 | B1 | 3/2011 | Castelli et al. |
| 8,433,848 | B1 * | 4/2013 | Naamad ............... G06F 3/0605 711/114 |
| 2006/0236061 | A1 | 10/2006 | Koclanes |
| 2007/0233868 | A1 | 10/2007 | Tyrrell et al. |

FOREIGN PATENT DOCUMENTS

WO    WO 2010/006127    1/2010

OTHER PUBLICATIONS

Charles Sutton et al—"Piecewise Training for Undirected Model's"—Jul. 4, 2012.

* cited by examiner

*Primary Examiner* — Craig Dorais
(74) *Attorney, Agent, or Firm* — Krishnendu Gupta; Jason A. Reyes

(57) ABSTRACT

Described are techniques for selecting resources for provisioning. A usage definition, including a piecewise objective function, and first set of logical profiles based on core criteria are selected. Each of the logical profiles in the first set represents a resource set characterized by a core criteria value set that specifies values for the core criteria. A second set of resulting objective function values are determined by evaluating one piece of the objective function for each of the logical profiles in the first set. A highest ranked one of the resulting objective function values in the second set is selected having a corresponding first logical profile of the first set and a corresponding core criteria value set. A third set of resources is selected which is characterized by the corresponding core criteria value set for the first logical profile. The third set of resources is any of recommended or selected for provisioning.

14 Claims, 14 Drawing Sheets

LOGICAL PROFILE A  314a
READ RATE (RP) = .134
SEQUENTIAL WRITE RATE (SWP) = .134
RANDOM WRITE RATE (RWP) = .022
CAPACITY RATE (CAP) = .67
COST RATE (COST) = .54

LOGICAL PROFILE B  314b
READ RATE (RP) = .4
SEQUENTIAL WRITE RATE (SWP) = .4
RANDOM WRITE RATE (RWP) = .08
CAPACITY RATE (CAP) = .32
COST RATE (COST) = .3

LOGICAL PROFILE C  314c
READ RATE (RP) = .8
SEQUENTIAL WRITE RATE (SWP) = .8
RANDOM WRITE RATE (RWP) = .16
CAPACITY RATE (CAP) = .16
COST RATE (COST) = .05

MSE USAGE DEFINITION  452
.7 * (.5*RP + 0*SWP + .5*RWP) + .2*CAP + .1*COST

LOGICAL PROFILE A  314a
READ RATE (RP) = .134
SEQUENTIAL WRITE RATE (SWP) = .134
RANDOM WRITE RATE (RWP) = .022
CAPACITY RATE (CAP) = .67
COST RATE (COST) = .54

LOGICAL PROFILE B  314b
READ RATE (RP) = .4
SEQUENTIAL WRITE RATE (SWP) = .4
RANDOM WRITE RATE (RWP) = .08
CAPACITY RATE (CAP) = .32
COST RATE (COST) = .3

LOGICAL PROFILE C  314c
READ RATE (RP) = .8
SEQUENTIAL WRITE RATE (SWP) = .8
RANDOM WRITE RATE (RWP) = .16
CAPACITY RATE (CAP) = .16
COST RATE (COST) = .05

MSE USAGE DEFINITION  453
.7 * (.5*RP + 0 * SWP + .5*RWP) + .2*CAP + .1*COST
.1 * (1*RP) + .9*CAP + .1*COST

FIG. 7A

LOGICAL PROFILE A  314a
READ RATE (RP) = .134
SEQUENTIAL WRITE RATE (SWP) = .134
RANDOM WRITE RATE (RWP) = .022
CAPACITY RATE (CAP) = .67
COST RATE (COST) = .54

LOGICAL PROFILE B  314b
READ RATE (RP) = .4
SEQUENTIAL WRITE RATE (SWP) = .4
RANDOM WRITE RATE (RWP) = .08
CAPACITY RATE (CAP) = .32
COST RATE (COST) = .3

LOGICAL PROFILE C  314c
READ RATE (RP) = .8
SEQUENTIAL WRITE RATE (SWP) = .8
RANDOM WRITE RATE (RWP) = .16
CAPACITY RATE (CAP) = .16
COST RATE (COST) = .05

MSE USAGE DEFINITION  454
.7 * (.5*RP + 0*SWP + .5*RWP) + .2*CAP + .1*COST
.1 * (1*RP) + .9*CAP + .1*COST
.6 * (.5*RA + .5*RWA) + .4*CAP + .1*COST

RESOURCE PROVISIONING BASED ON LOGICAL PROFILES AND PIECEWISE OBJECTIVE FUNCTIONS

TECHNICAL FIELD

This application relates generally to provisioning resources for use in a system such as a data storage system, and in one particular embodiment the application relates to provisioning resources for use in a heterogeneous pool in a data storage system.

BACKGROUND OF THE INVENTION

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units. The logical disk units may or may not correspond to the actual disk drives. Allowing multiple host systems to access the single data storage system allows the host systems to share data stored on devices of the storage system. In order to facilitate sharing of the data on the various devices of the data storage system, additional software on the data storage system may also be used.

Different tasks may be performed in connection with a data storage system. For example, a customer may perform data storage configuration and provisioning tasks. Such tasks may include, for example, configuring and provisioning storage for use with an email server application. Tasks may include allocating storage, specifying the logical and/or physical devices used for the storage allocation, specifying whether the data should be replicated, the particular RAID (Redundant Array of Independent or Inexpensive Disks) level, and the like. With such options in connection with performing configuration and provisioning tasks, a customer may not have the appropriate level of sophistication and knowledge needed.

SUMMARY OF THE INVENTION

There is disclosed a method for use in selecting resources for provisioning, the method comprising: selecting a usage definition and a first set of one or more logical profiles based on one or more core criteria, wherein said usage definition includes a piecewise objective function and wherein each of the logical profiles in the first set represents a resource set of one or more resources characterized by a core criteria value set that specifies one or more values for the one or more core criteria; determining a second set of resulting objective function values by evaluating one piece of the objective function for each of the logical profiles in the first set, wherein each logical profile in the first set has a different corresponding resulting objective function value in the second set; selecting a highest ranked one of the resulting objective function values in the second set, wherein the highest ranked one of the resulting objective function values in the second set has a corresponding first logical profile of the first set and a corresponding core criteria value set; and determining a third set of one or more resources characterized by the corresponding core criteria value set for the first logical profile, wherein the third set of one or more resources is any of recommended or selected for provisioning.

There is also disclosed an apparatus for use in selecting resources for provisioning, wherein the apparatus comprises: an interface; memory; and control circuitry coupled to the interface and memory, the memory storing instructions, which, when carried out by the control circuitry, cause the control circuitry to: select a usage definition and a first set of one or more logical profiles based on one or more core criteria, wherein said usage definition includes a piecewise objective function and wherein each of the logical profiles in the first set represents a resource set of one or more resources characterized by a core criteria value set that specifies one or more values for the one or more core criteria; determine a second set of resulting objective function values by evaluating one piece of the objective function for each of the logical profiles in the first set, wherein each logical profile in the first set has a different corresponding resulting objective function value in the second set; select a highest ranked one of the resulting objective function values in the second set, wherein the highest ranked one of the resulting objective function values in the second set has a corresponding first logical profile of the first set and a corresponding core criteria value set; and determine a third set of one or more resources characterized by the corresponding core criteria value set for the first logical profile, wherein the third set of one or more resources is any of recommended or selected for provisioning.

There is further disclosed a computer program product having a non-transitory computer readable storage medium which stores a set of instructions for use in selecting resources for provisioning, the set of instructions, when carried out by computerized circuitry, causing the computerized circuitry to perform a method of: selecting a usage definition and a first set of one or more logical profiles based on one or more core criteria, wherein said usage definition includes a piecewise objective function and wherein each of the logical profiles in the first set represents a resource set of one or more resources characterized by a core criteria value set that specifies one or more values for the one or more core criteria; determining a second set of resulting objective function values by evaluating one piece of the objective function for each of the logical profiles in the first set, wherein each logical profile in the first set has a different corresponding resulting objective function value in the second set; selecting a highest ranked one of the resulting objective function values in the second set, wherein the highest ranked one of the resulting objective function values in the second set has a corresponding first logical profile of the first set and a corresponding core criteria value set; and determining a third set of one or more resources characterized by the corresponding core criteria value set for the first logical profile, wherein the third set of one or more resources is any of recommended or selected for provisioning.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6, 7, 7A and 7B are examples illustrating further detail regarding logical profiles and usage definitions in an embodiment in accordance with techniques herein;

DETAILED DESCRIPTION

Figure 1:
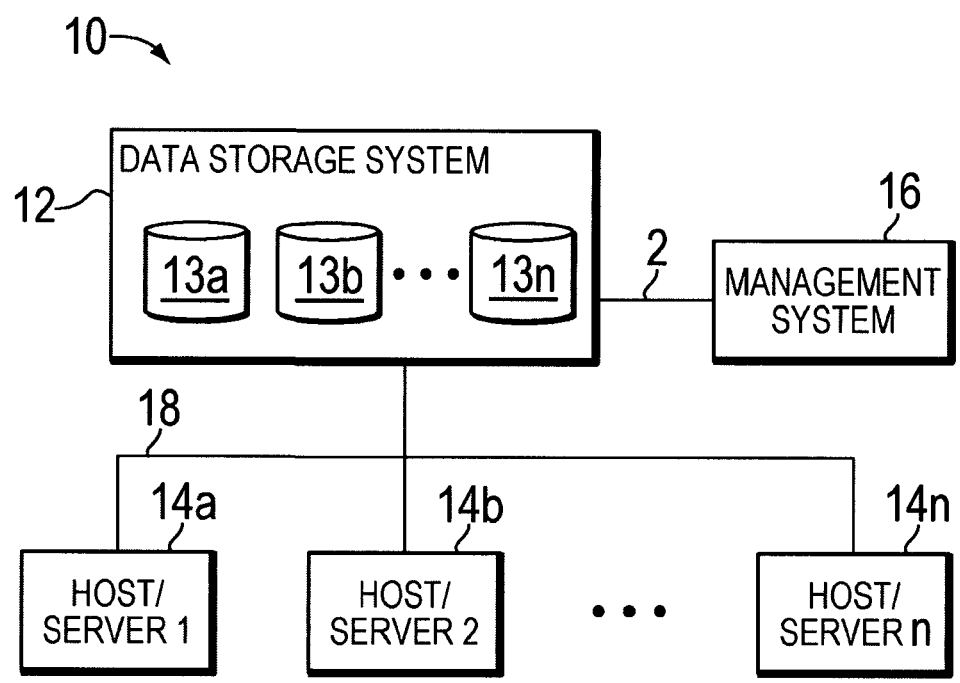
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices or switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems, such as data storage arrays, offered by EMC® Corporation of Hopkinton, Mass. For example, an embodiment in accordance with techniques herein may include the VNXe™ storage system by EMC® Corporation. Each of the data storage systems may include one or more data storage devices 13a-13n, such as disks. One or more data storage systems may be manufactured by one or more different vendors. Each of the data storage systems included in 12 may be inter-connected (not shown). As mentioned above, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
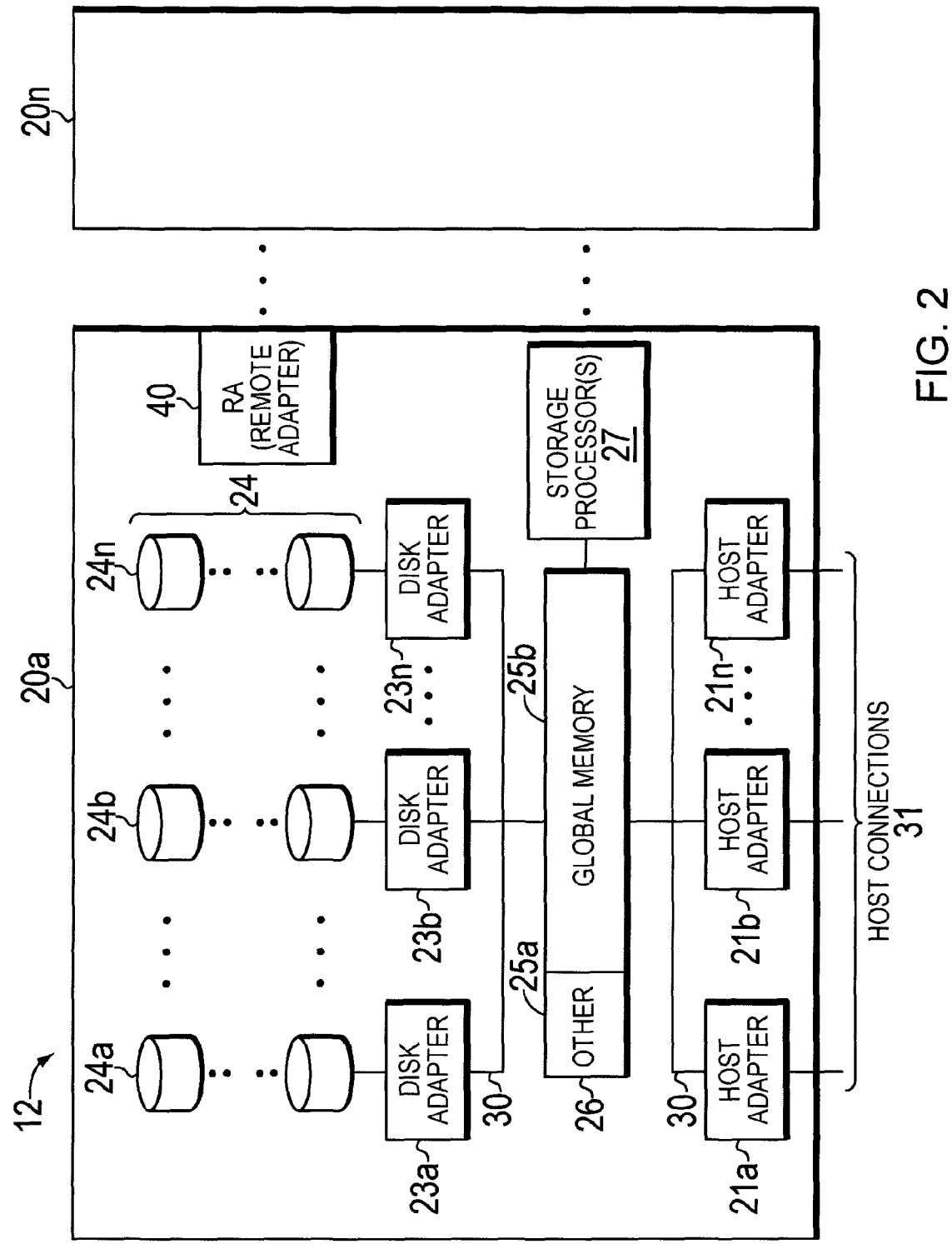
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. It should be noted that elements 24a-24n generally represent one or more different data storage devices analogous to elements 13a-13n of FIG. 1. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNXe™ data storage system by EMC Corporation includes two storage processors. The system 20a may also include one or more host adapters ("HAs") or directors 21a-21n. Each of the HAs may be used to manage communications and data operations between one or more host systems and the memory 26. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs (remote adapters), and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. In some embodiments of a data storage system, the memory 26 may be partitioned into two or more portions such as a global memory portion 25b and one or more other portions 25a. For example, in some embodiments of a data storage system including a single storage processor 27, the global memory portion 25b may be used to facilitate data transfers and other communications between the DAs, HAs and RAs in a data storage system. The DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, an embodiment of a data storage system, such as the VNXe™ data storage system by EMC Corporation, may include multiple storage processors each with their own memory used for communication between the different front end and back end components rather than utilize a global memory accessible to all storage processors. In such embodiments, memory 26 may represent memory of each such storage processor.

The particular data storage system as described in this embodiment, or a particular device thereof, such as a disk or other storage device, should not be construed as a limitation. Other types of commercially available data storage systems, as well as processors and hardware controlling access to these particular devices, may also be included in an embodiment.

Described in following paragraphs are techniques that may be used in connection with automatically selecting what underlying physical storage resources are best when provisioning storage for a logical device for use by a client such as a host system, or application executing thereon.

Before describing such techniques, reference is made to an initial discussion of how physical storage devices may be configured for use by an application in one embodiment. In such an embodiment, physical devices may be configured into one or more storage pools.

The physical storage devices of the data storage system may be configured or partitioned into storage pools. An embodiment may form one or more such storage pools for use in connection with servicing a provisioning request prior to the issuance of the provisioning request. In other words, the physical storage devices may be configured into one or more storage pools at a first point in time. At a second later point in time, storage may be allocated from the previously formed storage pools in connection with a provisioning request to allocate storage for a logical device for use with an application hosting data on the data storage system. Storage pools may be formed at different points in time in connection with the life cycle of a data storage system. For example, storage pools may be formed as part of data storage system initialization and startup processing and when new data storage devices are added to a data storage system. An embodiment may also form storage pools from only a portion of storage devices at a first point in time and then later configure additional storage devices. Additionally, an embodiment may also reconfigure storage devices. For example, a first physical device may initially be configured for use in a first storage pool. At a later point in time, the first physical device may be reconfigured for use with a second storage pool.

Figure 3:
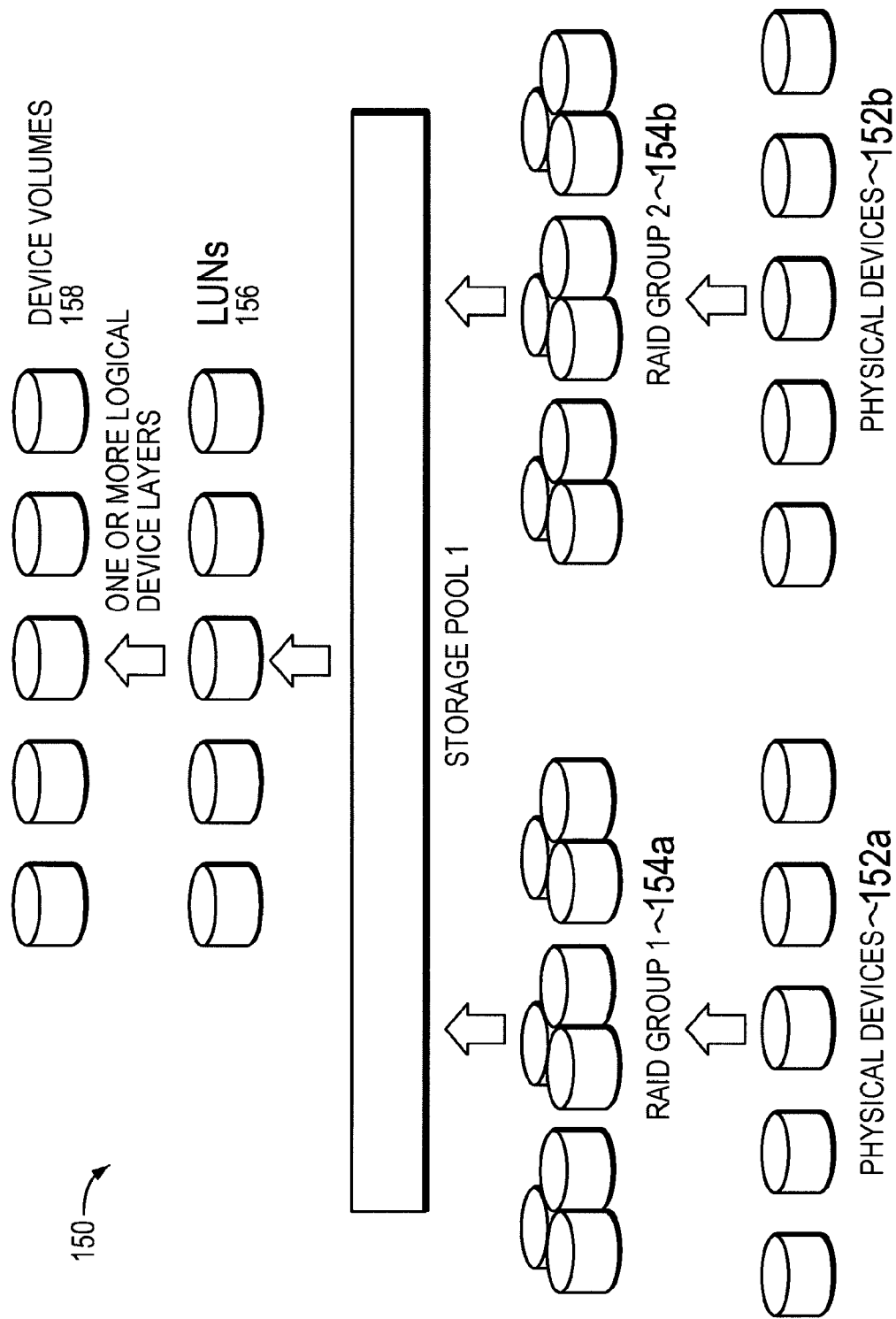
FIG. 3 is an example illustrating how storage pools may be configured in an embodiment in accordance with techniques herein.

Referring to FIG. 3, shown is an example representing how storage pools may be formed from physical devices in an embodiment in accordance with techniques herein. The example 150 illustrates how storage pools may be constructed from groups of physical devices. For example, RAID Group 1 154a may be formed from physical devices 152a and RAID Group 2 154b may be formed from physical devices 152b whereby both RAID groups 154a, 154b form the storage pool 1. A storage pool may have a particular RAID level and RAID configuration or layout for the type of storage pool being formed. For example, for physical devices 152a on a first data storage system type when forming a storage pool, RAID-5 may be used in a 4+1 configuration (i.e., 4 data drives and 1 parity drive for each 5 drives in the RAID group). The RAID groups 154a, 154b of the storage pool may be used to provide underlying provisioned storage for a number of data storage LUNs 156. An embodiment may also utilize one or more additional logical device layers on top of the LUNs 156 to form one or more logical device volumes 158. The particular additional logical device layers used, if any, may vary with the data storage system. It should be noted that there may not be a 1-1 correspondence between the LUNs of 156 and the volumes of 158. The storage pool 1 of the example 150 illustrates two RAID groups being used to define a single storage pool although, more generally, one or more RAID groups may be used to form a storage pool in an embodiment using RAID techniques.

An embodiment in accordance with techniques herein may have a plurality of different storage tiers. Each tier may generally include physical storage devices or drives having one or more attributes or characteristics associated with a definition for that tier. For example, an embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive, and the like. Data protection may specify a type or level of data storage protection such, for example, as a particular RAID level (e.g., RAID1, RAID-5 3+1, RAIDS 7+1, and the like). Performance characteristics may relate to different performance aspects of the physical storage devices of a particular type or technology. For example, there may be multiple types of magnetic disk or spinning media type of FC drives based on the RPM characteristics of the FC drives (e.g., 10K RPM FC drives and 15K RPM FC drives) and FC drives having different RPM characteristics may be included in different storage tiers. Storage capacity may specify the amount of data, such as in bytes, that may be stored on the drives. An embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives (also referred to herein as EFD (enterprise flash drives or devices), a second tier of all FC (Fibre Channel) or SAS (Serial Attached SCSI (Small Computer System interface)) drives which are a type of magnetic disk or other spinning media type, and a third tier of all NL SAS (Near Line SAS) drives which are another type of magnetic disk or other spinning media type. The foregoing are some examples of tier definitions and other tier definitions may be specified.

Described herein are techniques that may be used to facilitate automated decision making and selection of data storage system resources. For example, techniques herein may be used for automated storage provisioning providing for an automated intelligent decision-making process without requiring user interaction/human intervention.

As described in more detail below, techniques herein may be used to automatically determine, and select for provisioning, a set of one or more data storage resources. In an embodiment, the selected resources may be characterized as a best selection of data storage resources and storage may be automatically provisioned from the selected resources. Alternatively, the selected resources may be provided as advice or a recommendation, for example, to a data storage administrator who may then choose whether to proceed with provisioning from the selected resources. The data storage system resources may be physical storage devices characterized in an abstract manner by one or more criteria including characteristics and/or features of the storage resources. Thus, a set of one or more data storage system resources having a particular set of values for the one or more criteria may be characterized as a logical abstraction of the underlying physical storage devices included in the set. Thus, system resources, such as physical storage devices, may be logically partitioned into different resource sets based on the particular set values for the one or more criteria. This is described in more detail below.

The one or more criteria used to logically and abstractly characterize sets of resources may generally include physical level characteristics such as physical storage device characteristics and features. In one embodiment, the one or more criteria may include core criteria and optionally include additional criteria.

The core criteria may include one or more characteristics and/or features of the physical devices such as, for example, the type of physical storage device related to the underlying drive technology (e.g., such as FED or SSD devices, rotating SATA (Serial Advanced Technology Attachment) drives, rotating SAS drives, 10K RPM rotating PC drives, 15K RPM rotating PC drives, and the like), RAID protection level (e.g., such as whether the physical devices are configured in a RAID-5 group, a RAID-6 group, a RAID-1 group, and the like) and RAID stripe length. RAID stripe length is an integer identifying, for a single configured RAID group, the number of physical drives or RAIL) group drive members used for storing a single stripe of data. This includes the number of drives used to store both parity information and user data in a single stripe. Thus, stripe length may represent the total number of physical drives in a single RAID group in a single stripe.

As described below, the core criteria may be used as primary selection criteria for selecting from among storage resources. Once such storage resources have been selected, additional criteria may be utilized to determine, for example, whether to enable or disable particular features or characteristics with respect to the selected storage resources. The additional criteria may be optionally specified and may be used, for example, to optimize selected resources with respect to a particular aspect (e.g., characteristic or feature) of the underlying physical storage devices at the physical level. For example, the additional criteria may include characteristics and/or features of the physical devices such as whether data deduplication is enabled/disabled, whether thin or virtual device provisioning is enabled/disabled, whether self encryption is enabled/disabled, whether data compression is enabled/disabled, whether data backup or data replication is enabled/disabled, and the like. For example, data deduplication may be enabled to improve capacity without adversely impacting performance, Data deduplication, thin or virtually provisioned devices, and self encryption are known in the art. Data deduplication relates to techniques for eliminating redundantly stored data by keeping only a single copy of the data and using references or tokens to denote each reference to the single physical copy of data as may be included in different files. A thin or virtually provisioned device is a logical device having its underlying physical storage provisioned as needed as different portions of the logical device are written to (e.g., rather than allocate physical storage for the entire thin device capacity upon creation of the thin device). A thin device may be virtually provisioned in terms of its allocated physical storage whereby the thin device is presented to a host as having a particular capacity with a corresponding LBA (logical block address) range and portions of the LBA range may not be mapped to, or associated with, allocated storage. Thus, an access of the logical storage space of the thin device results in either a null pointer (or equivalent) indicating that no corresponding physical storage space has yet been allocated, or results in a reference to a data device which in turn references the underlying physical storage space. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, U.S. patent application Ser. No. 11/903,869, filed Sep. 25, 2007, DATA DEDUPLICATION USING THIN PROVISIONING, Veprinsky et al., EMS-177US, and U.S. Pat. No. 7,949,637, Issued May 24, 2011, Storage Management for Fine Grained Tiered Storage with Thin Provisioning, to Burke, all of which are incorporated by reference herein. Self encryption may refer to the underlying physical devices which provide for encrypting data stored thereon. Compression, when enabled, stores data in a compressed form. Backup or replication, when enabled, may provide for backing up or replicating stored data.

In this manner, an embodiment may abstractly characterize the underlying physical storage devices based on criteria including core criteria and optionally additional criteria. As described below in more detail, a first set of logical profiles may be defined based on the one or more core criteria. Each of the logical profiles in the first set may be based on a particular set of values for the core criteria whereby the particular set of values characterizes a set of resources in an abstract manner. As also described in more detail below, an embodiment in accordance with techniques herein may provide one or more usage definitions. Each usage definition may characterize a particular usage of the storage system resources and may specify the particular requirements, needs, goals, objectives, and the like, of the particular usage (e.g., application or policy). An objective function included in each usage definition may characterize a particular usage of storage system resources, Each of the logical profiles in the first set may specify values for different parameters of the objective function used in connection with techniques herein.

To further illustrate, the storage administrator may need to provision storage for logical devices used by a particular application such as an electronic mail (email) server application like Microsoft Exchange (MSE), may need to provision storage for logical devices based on a particular requirement/set of requirements (e.g., to achieve very high performance/high performance objective, may need to provision storage for logical devices to achieve a desired cost objective), and the like. In such cases, techniques herein may be used to determine and select a set of one or more physical resources which are best or optimal for data storage provisioning, whereby best or optimal may be determined in accordance with particular requirements, needs, goals, objectives, and the like, of the particular usage (e.g., application or policy) as expressed in a usage definition.

Techniques herein may use an objective function in connection with evaluating and determining an optimal set of physical data storage system resources which are characterized by a set of values for the core criteria (e.g., core criteria values). Logical profiles may be based on different core criteria values sets and used with the objective function to determine which of the logical profiles, and hence which of the core criteria values sets and characterized resources, are best or optimal for a particular usage.

The objective function may formulaically express how to evaluate different parameters characterizing aspects of the resources in order to select which of data storage system physical resources are best or optimal. As known to those skilled in the art, an objective function may be generally used in the fields of mathematics and computer science to resolve an optimization problem to find the best solution. Techniques herein use an objective function to facilitate evaluation of the different physical data storage system resources and provide for automated selection and determination of which of the resources are best or optimal.

Generally, an objective function may be expressed as a mathematical equation in any suitable form. Examples of objective functions are provided in following paragraphs for illustration. An objective function may be expressed as a summary of mathematical terms. Different terms may relate to different aspects or characteristics of physical storage resources and also factors or coefficients expressing weights regarding the importance/lack of importance of the different characteristics. Objective functions used with techniques herein may be used to determine a resulting value whereby the best or optimal resource may be determined based on the maximum or the minimum objection function resulting value. Whether the minimum or maximum result value is used to determine the best resources depends on the particular objective function used in a particular embodiment. For example, an embodiment may use a first objective function to determine 3 resulting values for 3 different sets of resources where each of the sets of resources is abstractly characterized by a different logical profile and a different set of core criteria values. The 3 resulting objective function values may be ranked from highest to lowest whereby the higher the resulting value, the more preferred or optimal the resource set associated with the resulting value. Thus, the resource set and logical profile having the highest resulting value may be selected as the best or optimal selection for the particular usage expressed by the first objective function. As another example, an embodiment may use a second objective function to determine 3 resulting values for 3 different sets of resources where each of the sets of resources is abstractly characterized by a different logical profile and a different set of core criteria values. The 3 resulting objective function values may be ranked from lowest to highest whereby the lower the resulting value, the more preferred or optimal the resource set associated with the resulting value. Thus, the resource set and associated logical profile with the lowest resulting value may be selected as the best or optimal selection for the particular usage expressed by the second objective function. Note that with the second objective function, the lowest value may be ranked as the best or most preferred since an embodiment herein allows for use of objective functions which determine an optimal or best decision to be based on a lowest such value as opposed to a highest value.

In examples described in following paragraphs, the objective function may be used to determine a resulting value for each logical profile where the resulting values for the different logical profiles are then ranked. The logical file having the highest resulting value may be determined and the best set of resources is determined as the set of resources abstractly characterized by the logical profile having the highest resulting value. As described herein, a first set of logical profiles may be provided where each of the logical profiles in the first set represents a different particular set of values for the core criteria. Additionally, each of the logical profiles in the first set may be further associated with a set of underlying resources characterized by the set of values for the core criteria represented by the logical profile.

The objective function used in following examples may have a general form expressed as:

$$F = P \cdot (RA \cdot rp + SWA \cdot swp + RWA \cdot rwp) + C \cdot cap + S \cdot cost \quad \text{EQUATION 1}$$

whereby

F represents the resulting value of the objective function of EQUATION 1;

the following are factors (e.g., coefficients or weights) in EQUATION 1:

P represents a performance factor;
C represents a capacity factor;
S represents a cost factor;
RA represents read access factor;
SWA represents sequential write factor;
RWA represents random write factor; and the following are parameters in EQUATION 1 having values supplied in a logical profile abstractly representing and characterizing a set of physical storage devices:

rp is a read performance rate for the set of physical storage devices;
swp is a sequential write performance rate for the set of physical storage devices;
rwp is a random write performance rate for the set of physical storage devices;
cap is a capacity rate for the set of physical storage devices; and
cost is a cost rate for the set of physical storage devices.

Each of the parameters (e.g., rp, swp, rwp, cap, cost) may represent a different characteristic (e.g., attribute, feature or aspect) of the set of underlying physical storage devices abstractly represented by the logical profile including such parameters. Each of the parameters in EQUATION 1 is also associated with a different factor (e.g., coefficient or weight such as P, C, S, RA, SWA and RWA in EQUATION 1) denoting an importance of each factor in connection with the particular objective or goal being represented by the objective function. For example, an embodiment may use real values between 0 and 1.0 inclusively, as possible values for factors in EQUATION 1 denoting a weight or level of importance of the different parameters when evaluating the different physical storage device or storage resource sets abstractly represented by the different logical profiles based on core criteria.

In one embodiment as mentioned above, each of the different physical storage device sets characterized by a set of core criteria values may be described using a different logical profile. Thus, a logical profile describing a set of physical storage devices may provide values for the different parameters of EQUATION 1 (e.g., rp, swp, rwp, cap, cost) particular to that set of physical storage devices.

An embodiment may also include one or more usage definitions whereby each usage definition includes an objective function as a mathematical equation used to evaluate the different physical storage resources. A different usage definition may exist for each different type of usage having a different goal or objective. Thus, the objective function included in a usage definition expresses how to determine and select the best resources for a particular usage. Examples of different usages may relate, for example, to provisioning storage for a particular application (e.g., an email application such as MSE, virtualized environment such as VM Ware™ or Microsoft Hyper-V™, a database application such as for an Oracle database, financial or business application, and the like), based on a particular policy such as different aspects of service or different service levels (e.g., service levels of gold/high, silver/medium, and bronze/low for any one or more of cost, capacity, speed, security, fault tolerance (e.g, such as may be affected by the particular RAID group and other aspects of the storage system and its configuration)), and the like.

In accordance with techniques herein, a different resulting value for an objective function included in a usage profile may be determined for each of the logical profiles based on core criteria and associated with a set of resources. The logical profiles and associated resources sets may then be ranked based on the resulting objective function values. In one embodiment, the higher the objective function resulting value, the more preferred the associated resource set whereby the resource set associated with the highest resulting value is the best or optimal resource set selected for use with techniques herein.

Figure 4:
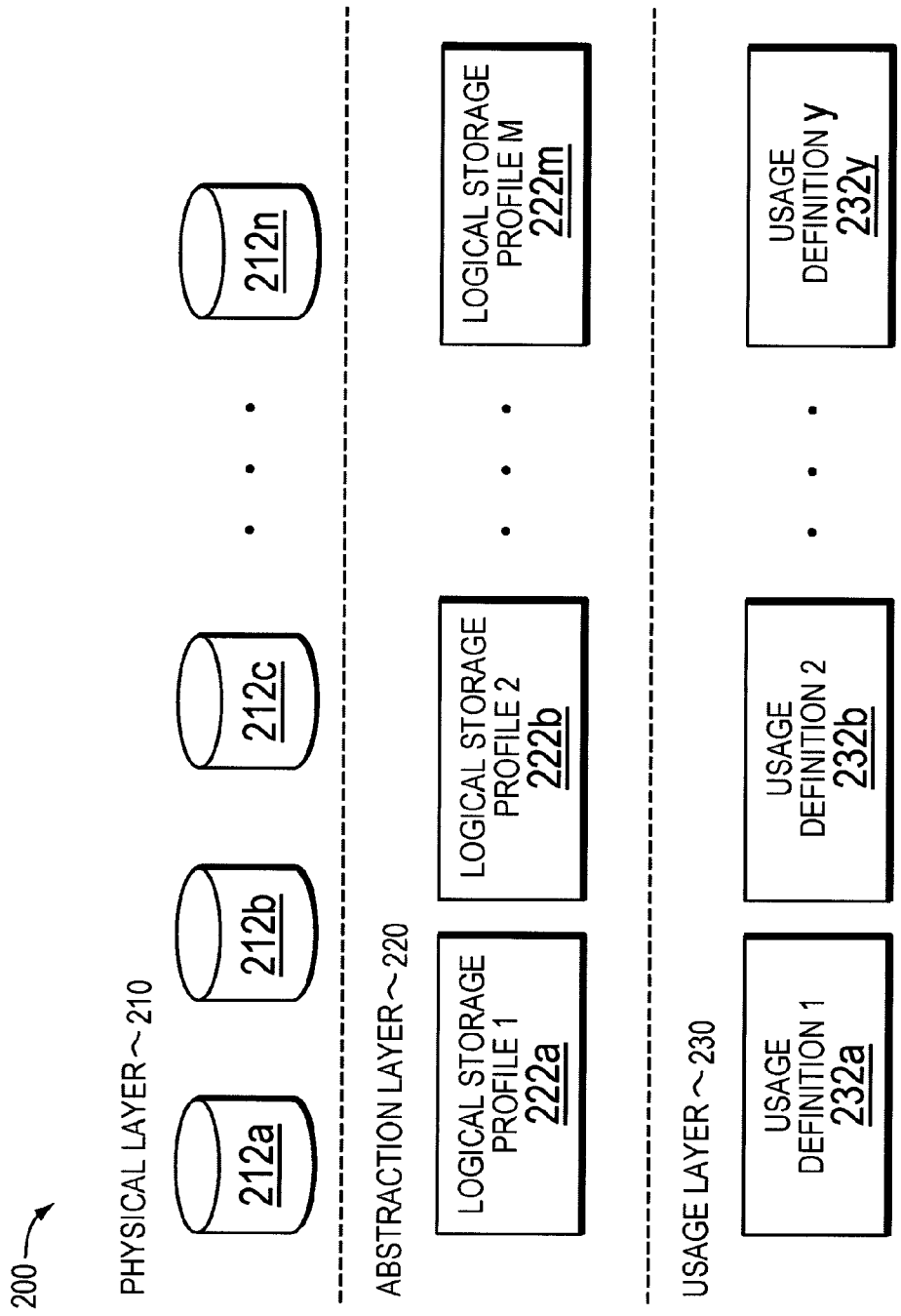
FIG. 4 is an example of different layers that may be used in an embodiment in accordance with techniques herein.

Referring to FIG. 4, shown is an example illustrating different levels or layers that may be used in an embodiment in accordance with techniques herein. The example 200 includes a physical layer 210, an abstraction layer 22 and a usage layer 230. The physical layer 210 may include the storage resources, such as physical storage devices 212a-n, used in connection with techniques herein for automated selection for provisioning decisions. As described elsewhere herein, the physical resources of the physical layer 210 may be abstractly characterized based on criteria, such as core criteria including characteristics of the underlying physical resources. In this example, the core criteria may include a physical storage device type or technology, a RAID level and a RAID stripe length. In this manner, a first set of logical profiles may be defined based on different core criteria values sets which are sets of particular instances of the different core criteria. Each logical profile associated with a different core criteria value set may include a set of rates which further characterize the underlying resources abstractly represented by the logical profile whereby the underlying resources are also characterized by the different core criteria value set.

Generally, the logical profiles are illustrated in the example 200 as 222a-m and may be based on core criteria, as just described, or one or more additional criteria. The logical profiles 222a-m may be included in abstraction layer 220 since they abstractly characterize the underlying physical resources of physical layer 210. The usage layer 230 includes the usage definitions 232a-y whereby each of the usage definitions may include an objective function based on the particular represented usage. Each of the logical profiles of layer 220 based on core criteria may include a set of one or more rates suitable for core criteria and use with an objective function in one or more of the usage definitions of layer 230. Each of the logical profiles of layer 220 based on one or more additional criteria may include a set of one or more rates suitable for such additional criteria and use with an objective function in one or more of the usage definitions of layer 230.

In this manner, the logical profiles of the abstraction layer 220 describe the physical storage resources of layer 210 in a normalized way to enable comparison and/or selection between different ones of the profiles. Abstraction layer 220 decouples provisioning targets or usage requirements from the underlying storage resources.

As mentioned above, a first set of one or more logical profiles of layer 220 may be provided for use with the core criteria and selecting from the storage resources of layer 210 in accordance with one of the usage definitions from layer 230. For example, in one embodiment, the core criteria may include drive technology or type (e.g., EFD, NL SAS (Near Line SAS), SAS, SATA, FC 10K RPM, FC 15K RPM, etc.), RAID level, and stripe length. Each logical profile in the first set may be based on a particular set of values or instances of the core criteria. For example, an embodiment may include physical storage devices of the following different technologies or types: EFD, NL-SAS and SAS. Additionally, the NL-SAS drives may be configured in a RAID-6 group having a stripe length of 6 (i.e., RAID-6 4+2 configuration with 4 data drives and 2 parity drive for each 6 drives in the RAID group), the SAS drives may be configured in a RAID-5 group having a stripe length of 5 (i.e., RAID-5 4+1 configuration with 4 data drives and 1 parity drive for each 5 drives in the RAID group), and the EFD drives may be configured in a RAID-5 group having a stripe length of 5 (i.e., RAID-5 4+1 configuration with 4 data drives and 1 parity drive for each 5 drives in the RAID group).

In connection with discussion herein, a particular set of values for core criteria may denote a logical partitioning or grouping of the physical storage devices of layer 210 into resource sets. Continuing with the above example, 3 sets of the physical storage devices in the system may be characterized based on the 3 sets of values noted above for the core criteria as follows:

Core criteria value set 1: NL-SAS, RAID-6, stripe length 6.
Core criteria value set 2: SAS, RAID-5, Stripe length 5.
Core criteria value set 3: EFD, RAID-5, Stripe length 5.

A first set of logical profiles may be defined which includes 3 logical profiles—one for each of the foregoing core criteria value sets.

Figure 5:
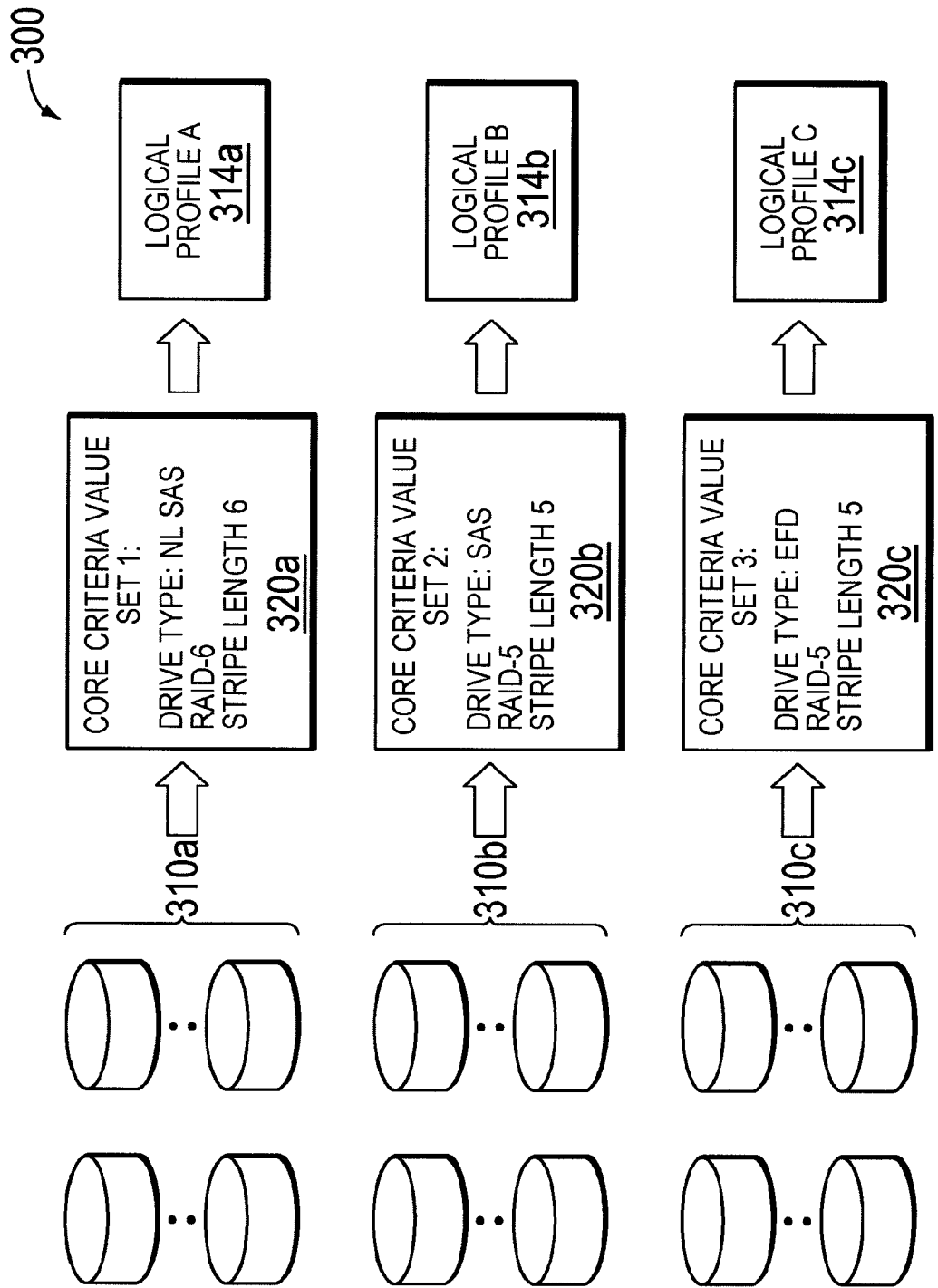
FIG. 5 is an example illustrating relationships between resources, core criteria value sets and logical profiles in an embodiment in accordance with techniques herein.

Referring to FIG. 5, shown is an example illustrating relationships between physical resources, core criteria value sets and logical profiles. The example 300 includes 3 sets of resources or physical storage devices 310a, 310b and 310c whereby each of the foregoing sets 310a-c is characterized by a different one of the core criteria values sets 320a-c. Additionally, the abstraction layer 220 includes 3 logical profiles 314a-c specifying rates for the particular sets of resources 310a-c. A set of resources, such as 310a, characterized by a core criteria value set, such as 320a, may have a corresponding logical profile, such as 314a, including rates further characterizing or describing the underlying set of resources 310a. It should be noted that element 320a represents the core criteria value set 1 noted above, element 320b represents the core criteria value set 2 noted above, and element 320a represents the core criteria value set 3 noted above. Thus, a set of resources 310a-c may be mapped respectively to, or abstractly represented using a core criteria value set 320a-c and associated with, respectively, a logical profile 314a-c.

Figure 6:
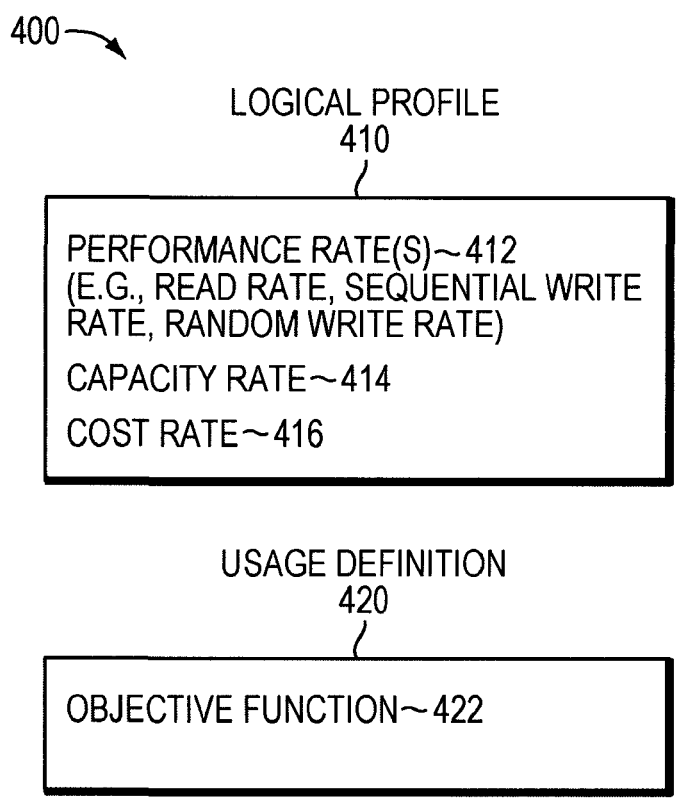

Referring to FIG. 6, shown is an example further illustrating information that may be included in a logical profile 410 based on core criteria or additional criteria and a usage definition 420 in an embodiment in accordance with techniques herein. The example 400 illustrates information that may be included in each logical profile 410 and each usage definition 420. Element 410 represents that each logical profile may include one or more performance rates 412, a capacity rate 414 and a cost rate 416. Each of the foregoing rates are described in more detail in following paragraphs. In one embodiment, each logical profile based on core criteria may include multiple performance rates 412 such as a read rate, a sequential write rate and a random write rate. Each usage definition 420 may include an objective function such as described in connection with EQUATION 1.

What will now be described are the different rates that may be included in a logical profile used in an embodiment in accordance with techniques herein.

For each resource set (e.g., such as each of 310a-c in FIG. 5) characterized by a set of core criteria values (e.g., such as each of 320a-c as in FIG. 5) as represented by a logical profile (e.g. such as each of 314a-c of FIG. 5), a base rate may be determined based on the RAID level and stripe length. For a RAID-6 group with a stripe length of n, two of the n drives store parity information. Given this, a base rate for physical drives of the resource set may be determined as:

Base rate=Performance factor*$((n-\#Parity\_drives)/n)$ EQUATION 2 where

Performance factor is a relative performance factor based on drive technology;

n is the stripe length for the RAID group; and

Parity_drives represents the quantity of the n drives used to write a stripe which contain parity information.

It should be noted that the performance factor used in EQUATION 2 for the different drive technologies may be based on industry averages and approximations regarding the relative performance of the different drive technologies.

The base rate determined using EQUATION 2 may be characterized as a relative base rate for a set of resources characterized by a particular set of core criteria values (e.g., having a particular RAID level, stripe length, and drive technology), relative to the remaining one or more sets of resources each also characterized by a different set of core criteria values (e.g., having an associated RAID level, stripe length and drive technology characterizing physical devices in the set).

The base rate for a set of resources abstractly represented by a logical profile may be used to determine different read and write base rates for the set of resources. Depending on the particular RAID group configuration for set of resources, the base rate determined using EQUATION 2 may be used "as is" or further modified to account for any additional performance penalty incurred for a particular type of read or write operation.

For example, in one embodiment having RAID-5 and RAID-6 groups, the base rate determined using EQUATION 2 may be used as the read rate and also the sequential write rate. However, the base rate for a set of resources configured as a RAID-5 or RAID-6 group may be further modified to determine the random write rate since an additional write performance penalty of 1/n, n being the RAID group strip size, is incurred for random writes.

For each resource set characterized by a set of core criteria values as represented by a logical profile, a capacity rate may be determined based on the RAID level and stripe length as follows:

$$\text{Capacity rate} = \text{Capacity factor} * n/10 \quad \text{EQUATION 3}$$

where

Capacity factor is a relative capacity factor based on drive technology;

n is the stripe length for the RAID group.

It should be noted that the capacity factor used in EQUATION 3 for the different drive technologies may be based on industry averages and approximations regarding the relative storage capacity differences of the different drive technologies. It should also be noted that just N may be used in an embodiment in EQUATION 3 rather than n/10 if such values for n are normalized. The stripe length n is divided by 10 in EQUATION 3 for normalization purposes.

The capacity rate determined using EQUATION 3 may be characterized as a relative capacity rate for a set of resources characterized by a particular set of core criteria values (e.g., having a particular RAID level, stripe length, and drive technology), relative to the remaining one or more sets of resources each also characterized by a different set of core criteria values (e.g., having an associated RAID level, stripe length and drive technology characterizing physical devices in the set).

For each resource set characterized by a set of core criteria values as represented by a logical profile, a cost rate may be determined based on the RAID level and stripe length as follows:

$$\text{Cost rate} = \text{Cost factor} * ((n - \#\text{Parity\_drives})/n) \quad \text{EQUATION 4}$$

where

Cost factor is a relative cost factor based on drive technology;

n is the stripe length for the RAID group; and

Parity_drives represents the quantity of the n drives used to write a stripe which contain parity information.

It should be noted that the cost factor used in EQUATION 4 for the different drive technologies may be based on industry averages and approximations regarding the relative cost differences of the different drive technologies.

The cost rate determined using EQUATION 4 may be characterized as a relative cost rate for a set of resources characterized by a particular set of core criteria values (e.g., having a particular RAID level, stripe length, and drive technology), relative to the remaining one or more sets of resources each also characterized by a different set of core criteria values (e.g., having an associated RAID level, stripe length and drive technology characterizing physical devices in the set).

Continuing with the example from FIG. 5 with the 3 core criteria value sets characterizing 3 resource sets each of which are associated with or abstractly represented by a different logical profile, what will now be described are particular examples of the different rates that may be included in the logical profiles 314a-c based on the EQUATIONS 2-4 above.

For the logical profile A 314a characterizing the storage devices 310a having core criteria value set 1 320a, a performance factor of 0.2 may be used with EQUATION 2 resulting in a base rate of 0.134 whereby the base rate is used as the read rate and sequential write rate. The base rate is further modified to account for a RAID-6 random write performance penalty so that a random write rate of 0.022 is used. For resources 310a characterized by core criteria value set 1 320a, a capacity factor of 1 may be used and a cost factor of 0.9 may be used. Based on EQUATION 3, the capacity rate of 0.67 may be determined. Based on EQUATION 4, the cost rate of 0.54 may be determined. Referring to FIG. 7, element 314a of the example 450 shows the foregoing information that may be included in the logical profile A 314a characterizing the storage devices 310a having core criteria value set 1 320a.

For the logical profile B 314b characterizing the storage devices 310b having core criteria value set 2 320b, a performance factor of 0.5 may be used with EQUATION 2 resulting in a base rate of 0.4 whereby the base rate is used as the read rate and sequential write rate. The base rate is further modified to account for a RAID-5 random write performance penalty so that a random write rate of 0.08 is used. For resources 310b characterized by core criteria value set 2 320b, a capacity factor of 0.4 may be used and a cost factor of 0.6 may be used, Based on EQUATION 3, the capacity rate of 0.32 may be determined. Based on EQUATION 4, the cost rate of 0.3 may be determined. Referring to FIG. 7, element 314b of the example 450 shows the foregoing information that may be included in the logical profile B 314b characterizing the storage devices 310b having core criteria value set 2, 320b.

For the logical profile C 314c characterizing the storage devices 310c having core criteria value set 3 320c, a performance factor of 1 may be used with EQUATION 2 resulting in a base rate of 0.8 whereby the base rate is used as the read rate and sequential write rate. The base rate is further modified to account for a RAID-5 random write performance penalty so that a random write rate of 0.16 is used. For resources 310c characterized by core criteria value set 3 320c, a capacity factor of 0.2 may be used and a cost factor of 0.1 may be used. Based on EQUATION 3, the capacity rate of 0.16 may be determined. Based on EQUATION 4, the cost rate of 0.05 may be determined. Referring to FIG. 7, element 314c of the example 450 shows the foregoing information that may be included in the logical profile C 314c characterizing the storage devices 310c having core criteria value set 3, 320c.

For a particular usage definition, such as 452 of FIG. 7 including an objective function, the objective function is evaluated with respect to each of the different logical profiles 314a-c to determine 3 resulting values for the objective function. Continuing with the above example for the objective function of 452, three resulting values may be determined—one for each logical profile 314a-c of the first set (and hence one objective function resulting value for each resources set and associated core criteria value set).

The usage definition 452 may be describe usage for MSE expressed using the following MSE objective function as in FIG. 7:

$$0.7*(0.5*RP+0*SWP+0.5*RWP)+0.2*CAP+ 0.1*COST$$

whereby consistent with EQUATION 1 above, the following factors are specified:

P=0.7, RA=0.5, SWA=0, RWA=0.5, C=0.2 and S=0.1

Based on the objective function of 452, the following resulting objective function calculations and values may be determined for each of the logical profiles 314a-c:

Profile 314a: 0.2426 (NL-SAS, RAID-6, Stripe length 6)
Profile. 314b: 0.262 (SAS, RAID-5, Stripe length 5)
Profile 314c: 0.373 (EFD, RAID-5, Stripe length 5)

The 3 resulting objective function values noted above may be ranked and a provisioning recommendation may be made based on the ranked resulting objective function values. In one embodiment, the resulting values may be ranked, from highest to lowest, whereby the largest resulting objective function value is selected. The logical profile of the first set associated with the largest resulting objective function value is determined. The storage devices selected have characteristics as included in the core criteria value set (e.g., particular values specified for drive technology or type, RAID level and stripe length) associated with the logical profile determined to have the largest resulting objective function value.

In this example, the logical profile 314c has the largest resulting objective function value and a provisioning recommendation or decision may be made to provision storage from storage devices 310c having the following core criteria characteristics of Drive type=EFD, RAID level=RAID5, stripe length=5).

Thus, the foregoing ranking results in completion of a first set of processing steps to select the storage resources, such as set of storage physical storage devices, used for provisioning.

Subsequent to selecting the storage resources to be used for provisioning, an embodiment may perform an optional second set of processing steps to determine whether to enable/disable certain characteristics or features such as in connection with optimizing the selected storage resources from the first step. Such optimization may be performed with respect to one or more of the different rates (e.g., performance, cost, and/or capacity). To further illustrate, an embodiment may also specify a second set of one or more logical profiles based on one or more additional criteria including additional characteristics and/or features of the physical storage devices. For example, an embodiment may provide a logical profile in the second set for deduplication in order to evaluate whether to enable or disable data deduplication for data stored on the selected storage devices as a result of the above-mentioned first set of processing steps. The logical profile in the second set may include a performance rate, capacity rate and cost rate denoting the impact or affect that data deduplication has on each of the these items. For example, the following may be included in the logical profile for data deduplication:

Performance rate (RP): −0.5
Capacity rate (CAP): 0.4
Cost rate (COST): 0

As with the other rates described herein, the foregoing rates in the data deduplication logical profile may also be characterized as estimates or approximations such as based on industry averages or generalizations across different data deduplication techniques that may be performed in an embodiment. Based on the above rates, data deduplication generally as an adverse impact of −0.50 on performance (since additional time is now used to perform the data deduplication processing for reads and writes), increases capacity generally by 40% and does not have any impact on cost.

In a manner similar to that as described above with the first set of processing steps, the objective function may be evaluated with respect to the foregoing rates included in the data deduplication logical profile to determine an objective function resulting value for data deduplication. If the resulting value is greater than zero or positive, it may be determined that data deduplication has a positive impact overall for the particular usage definition and selected storage devices and therefore it is recommended to enable data deduplication. If, however, the resulting value is negative, it may be determined that data deduplication has a negative impact overall for the particular usage definition and selected storage devices and therefore it is recommended to disable data deduplication. A resulting value of zero indicates a neutral or no impact and data deduplication may be either disabled or enabled without having an overall net effect (good or bad) in terms of overall impact to performance, capacity and cost with respect to the workload direct to, and data stored on, the selected storage devices.

Continuing with the above example, the following may be calculated using the objective function for MSE in the usage definition 452. The objective function for MSE (as included in the MSE usage definition 452) is:

$$0.7*(0.5*RP+0*SWP+0.5*RWP)+0.2*CAP+ 0.1*COST$$

and performance rate (RP)=0.5, capacity rate (CAP)=0.4 and cost rate (COST)=0 as included in the data deduplication logical profile noted above, which results in the objective function calculations as follows:

$$=(0.7*-0.5)+(0.2*0.4)+(0.1*0)=-0.27$$

thereby indicating that data deduplication has a negative overall impact and therefore processing herein may recommend not to perform data deduplication for data stored on the selected physical storage devices as determined using the first set of processing steps described above.

In a similar manner to that as described for the data deduplication features included in the additional criteria, an embodiment may also define additional logical profiles for other additional features or characteristics such as a logical profile for thin provisioning and yet another logical profile for self encryption.

Techniques herein provide for describing the physical resource characteristics abstractly using a first set of logical profiles based on core criteria, describing the usage requirements abstractly using the objective function, determining a resulting objective function value for each logical profile in the first set and then selecting a logical profile from the first set having the best resulting objective function value. As described herein, the best resulting value may be either the largest or smallest of all resulting objective function values determined for the first set of logical profiles depending on the particular objective function. Once the logical profile of the first set is selected, a storage provisioning recommendation may be made to provision storage from physical resources having the particular core criteria value set associated with the selected logical profile. If additional criteria and associated logical profile(s) are specified, then similar processing may be performed to evaluate the objective function and determine whether to recommend enabling or disabling any additional features.

The objective function included in the usage definitions may be specified in any suitable manner. For example, an objective function may be user specified (e.g., such as by a data storage administrator, or may be predefined (e.g., such as shipped with a data storage system and provided by a data storage system vendor such as EMC Corporation or a distributor, reseller or other third party selling such data storage systems to a customer or user).

Techniques herein are illustrated for use with physical resources of the data storage system which are physical storage devices. More generally, techniques herein may be used in connection with provisioning other physical resources for use by consumers of the resources and such techniques herein are not limited to use with physical storage devices.

It should be noted that the performance rates of the logical profiles used in connection with the core criteria specify nested performance rates for different sub types or sub rates for the different I/O types of read, sequential writes and random writes. However, an embodiment may include logical profiles such as the data deduplication logical profile which only includes a single performance rate that may be used as a single value with the performance factor without making use of any factors associated with the particular sub rates (e.g, without using the factors RA, SWA and RWA of EQUATION 2).

Referring to FIG. 7A, there is illustrated an example 450a similar to the example 450 of the previous figure. The example 450a comprises the logical profiles (314a, 314b, 314c) similar to the previous figure. However, the example 450a also comprises a usage definition 453 that includes a piecewise objective function. Each piece of the piecewise objective function characterizing a distinct usage requirement that defines part of the usage definition. For example, the piecewise objective function can comprise two pieces, as follows:

$$0.7*(0.5*RP+0*SWP+0.5*RWP)+0.2*CAP+\\0.1*COST \text{ (Piece 1)}$$

$$0.1*(1*RP)+0.9*CAP+0.1*COST \text{ (Piece 2)} \quad \text{EQUATION 5}$$

It should be understood that each of the parameters in each piece of the objective function may represent a different characteristic of the set of underlying physical storage devices. Each of the parameters in each piece of the objective function may also be associated with a different factor denoting the importance of a goal being represented by each piece of the objective function. For example, the first piece of the objective function comprises a performance factor of 0.7 and a capacity factor of 0.2 that results in the selection of storage resources with high performance attributes and low capacity attributes (i.e., EFD devices) as described above. The second piece of the objective function comprises a performance factor of 0.1 and a capacity factor of 0.9 that leads to the selection of storage resources with low performance and high capacity attributes.

By evaluating each piece of the piecewise objective function for each of the logical profile, two sets of resulting objective function values may be determined. The ranking of the values enables two sets of resources to be selected that are most likely to meet the different usage requirements. These two sets of selected resources can then be recommended or selected for provisioning. If the resources are selected for provisioning the two sets can then be arranged in a heterogeneous pool. This will be described further below.

Referring to FIG. 7B, there is illustrated another example 450b similar to the previous example 450a. However, the example 450b also comprises a usage definition 454 that includes a piecewise objective function. Each piece of the piecewise objective function characterizing a distinct usage requirement that defines part of the usage definition. For example, the piecewise objective function can comprise three pieces, as follows:

$$0.7*(0.5*RP+0*SWP+0.5*RWP)+0.2*CAP+\\0.1*COST \text{ (Piece 1)}$$

$$0.1*(1*RP)+0.9*CAP+0.1*COST \text{ (Piece 2)}$$

$$0.6*(0.5*RA+0.5*RWA)+0.4*CAP+0.1*\\COST \text{ (Piece 3)} \quad \text{EQUATION 6}$$

The first and second pieces are similar to those described above with respect to the previous figure. However, the third piece comprises parameters and factors different to the other two pieces. The third piece has a usage requirement somewhat intermediate the other two pieces, wherein the performance factor is 0.6 and the capacity factor of 0.4.

By evaluating each piece of the objective function for each of the set of logical profiles, three sets of resulting objective function values may be determined. The ranking of the values enables sets of resources to be selected that meet the respective usage requirements. These three sets of selected resources can then be recommended or selected for provisioning. If the resources are selected for provisioning the three sets can then be arranged in a heterogeneous pool.

Advantageously, the examples 450a and 450b can assist in selecting a heterogeneous storage pool layout that best fits a specific storage usage. It should be understood from the foregoing that each piece can be used to find an optimal part of a heterogeneous storage pool by evaluating each piece for each of the logical profile. The selected storage resources can be arranged in a heterogeneous storage pool that consists of multiple parts with each part corresponding to a single pool part. For example, the heterogeneous storage pool can be made up of the following parts:
EFD5.5: 5%
SAS5.5: 20%
NL-SAS6.6: 75%

It should be understood that the heterogeneous storage pool is made up of three parts with a first part consisting of EFD devices in a RAIDS configuration with stripe length 5 making up 5 percent of the capacity. The second part consisting SAS devices in a RAIDS configuration with stripe length 5 making up 20 percent of the capacity. The third part consisting NL-SAS devices in a RAID6 configuration with stripe length 6 making up 75 percent of the capacity. As discussed above, the examples 450a and 450b enable the selection of different parts or different resources that match different usage requirements. The resources are ultimately selected to form a heterogeneous storage pool that meets different usage requirements. The heterogeneous storage pool can then be leveraged by auto-tiering technologies, such as FAST VP supplied by EMC Corporation of Hopkinton, Mass., which can migrate the data between the different resources based on data temperature and/or other policies.

Advantageously, the examples 450a and 450b can also assist with problems associated with skew. The examples 450a and 450b can assist with the issue of skew by enabling the servicing of different parts of the workload with the most economically efficient resource type (e.g., flash for the part of the data that is frequently accessed and cheaper resources for the information that is accessed rarely).

If there is more than piece in a piecewise objective function then it may also be necessary to determine the amount of resources to be selected by each piece. For example, a request for provisioning may comprise information, as follows:

Initial size: 500 GB
Data growth rate: 60% per year (i.e., 0.82 GB per day)
Active data interval: 60 days (i.e., data to remain hot for 60 days)

The information may enable an estimate of the capacity to be serviced by each of the selected resources. One particular example is as follows:

$$0.82*60/(500+0.6*500)=0.0615$$

It should be understood that by evaluating the first piece for each of the logical profiles, a set of resources may be selected that will provide circa 6 percent of the storage. The remaining circa 94 percent may be serviced by resources selected by applying the other pieces to logical profiles. For example, in this embodiment, the set of resources providing the circa 6 percent of the storage can be arranged in a heterogeneous storage pool to store hot frequently accessed data. The other sets of resources can be arranged in the heterogeneous storage pool to store cool less frequently accessed data and cold rarely accessed data. For example, in this embodiment, there may be three parts in the heterogeneous pool with the respective parts associated with hot, cool and cold data, respectfully. The auto-tiering mechanism can then migrate the data between the respective parts based on data temperature and/or other policies.

Figure 8:
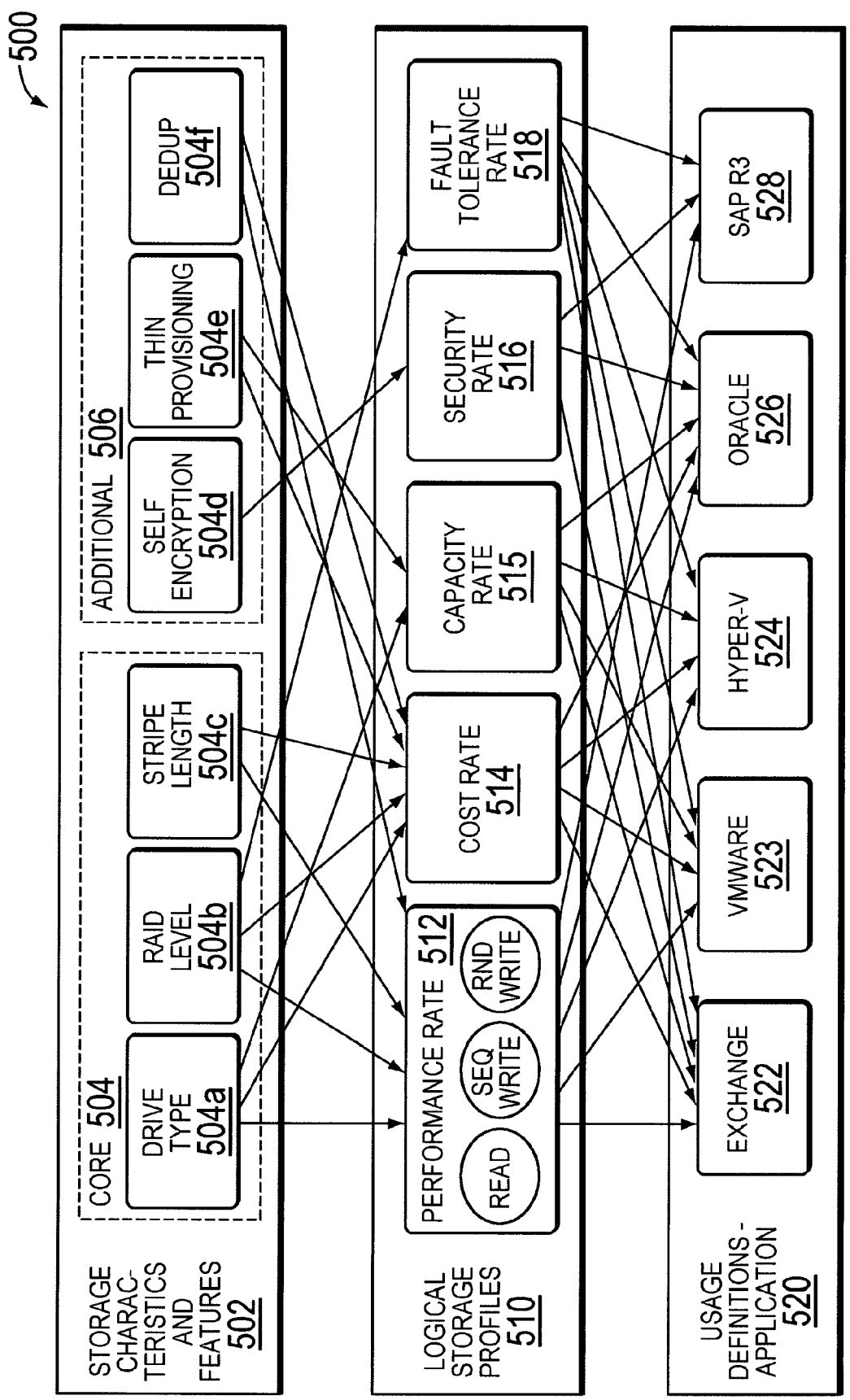
FIGS. 8, 9 and 10 are examples illustrating further detail regarding dependencies between different physical device characteristics and features (e.g., core criteria and additional criteria, rates of the logical profiles, and objective functions of usage definitions in an embodiment in accordance with techniques herein.

Referring to FIG. 8, shown is an example illustrating further detail regarding dependencies between different physical device characteristics and features, rates of the logical profiles, and objective functions of usage definitions in an embodiment in accordance with techniques herein. The example 500 includes storage characteristics and features 502 denoting core 504 and additional criteria 506 that may be specified and used in an embodiment. In this example, the core criteria 504 may include drive type or technology 504a, RAID level 504b, and stripe length 504c. The additional criteria may include self encryption 504d, thin provisioning 504e and data deduplication 504f. Description above provided examples using the core criteria 504 and additional criteria 504f. In a similar manner, techniques herein may be used with other additional criteria 504d and 504e.

Element 510 denotes that each of the logical profiles may include one or more performance rates 512, cost rate 514, capacity rate 515, security rate 516 and fault tolerance (FT) rate 518. Description above provided examples using the rates 512, 514, and 516. In a similar manner, techniques herein may be used with other rates 516 and 518.

It should be noted that the arrows between the characteristics or features of criteria 502 and the different rates of 510 illustrate dependencies between the criteria 502 and the various rates of 510. For example, the self encryption feature 504d included in criteria 502 influences security rate 516. Additionally, the one or more performance rates 512 are influenced by, or depend upon, 504a-c and 504f, and the rates 512 and 514 are influenced by, or depend upon, data deduplication 504f (e.g. if data deduplication is enabled, the performance rate 512 and cost rate 514 is affected as described above in connection with the example of additional criteria including deduplication).

Element 520 illustrates exemplary usage profiles that may be used in an embodiment specifying usage for different applications such as MSE 522, VM Ware 523. Microsoft Hyper-V 524, Oracle Database 526, and a financial application 528.

It should be noted that the arrows between the different rates of 510 and the different usage definitions of 520 illustrate dependencies between the rates 510 and the various objective functions in the usage definitions of 520. For example, consistent with the examples described above, MSE 522 has an objective function that depends on, or uses, rates 512, 514, 515 and 516.

The example 500 illustrates in more detail dependencies and influences as well as usage definitions specified for applications.

Figure 9:
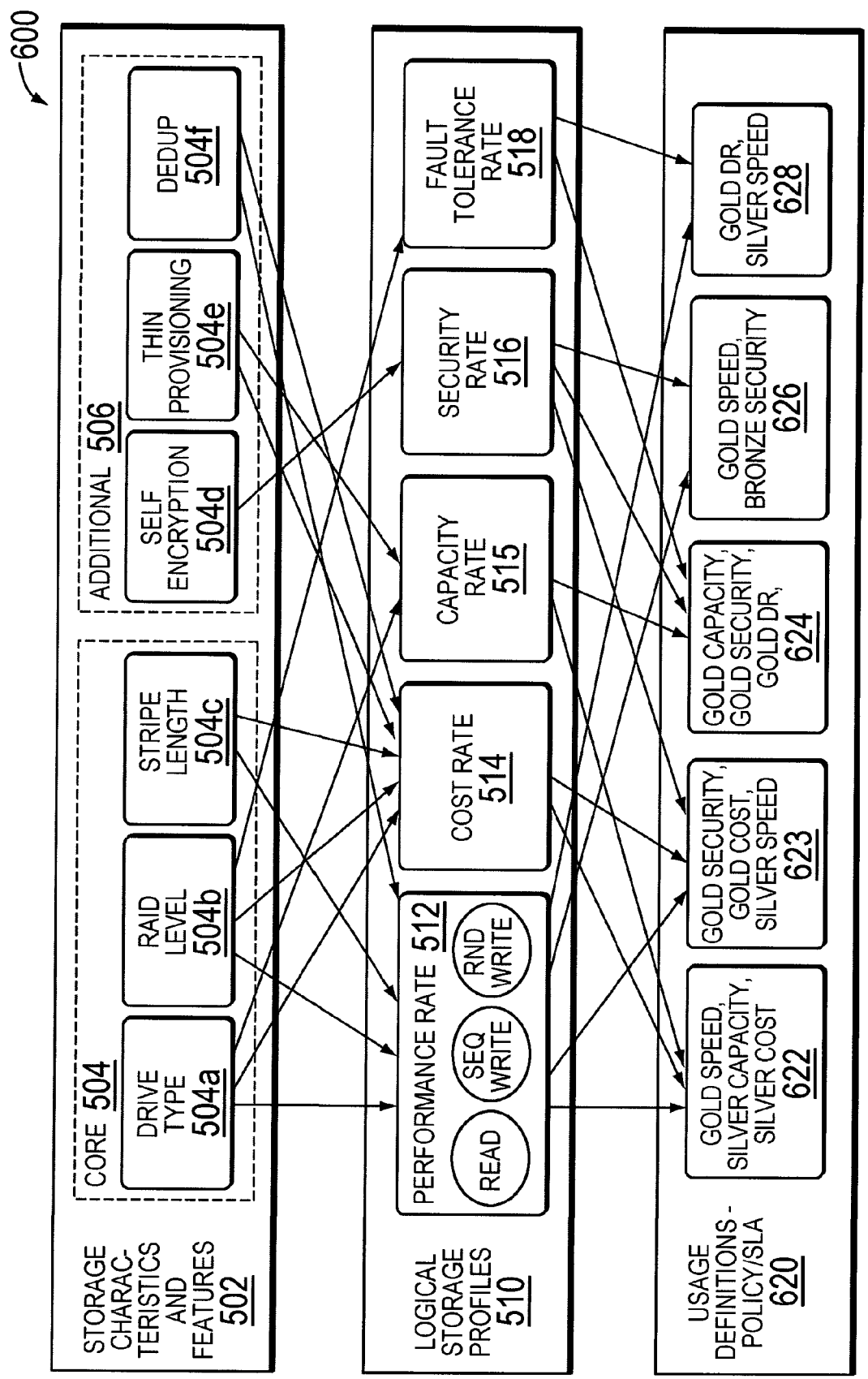

With reference now to FIG. 9, shown is another example providing additional examples of different usage definitions that may be included in an embodiment in accordance with techniques herein. In the example 600, the characteristics and features 502 and various rates of 510 are as described in the example 500. In the example 600, different usage definitions 622, 624, 626 and 628 are illustrated where each usage definition of 620 may express usage in terms of a policy or service level agreement (SLA) having 3 predefined SLA levels of gold, silver and bronze for each of speed, security, cost and capacity. Gold may denote the highest level of service. Silver may denote the next highest level of service and bronze may denote the lowest level of service. Each of the service levels may be associated with predetermined or predefined numeric values. The objective function may be expressed using the particular service level applicable for a usage definition as opposed to expressing values of the objective function as numeric quantities such as illustrated above in EQUATION 1.

Figure 10:
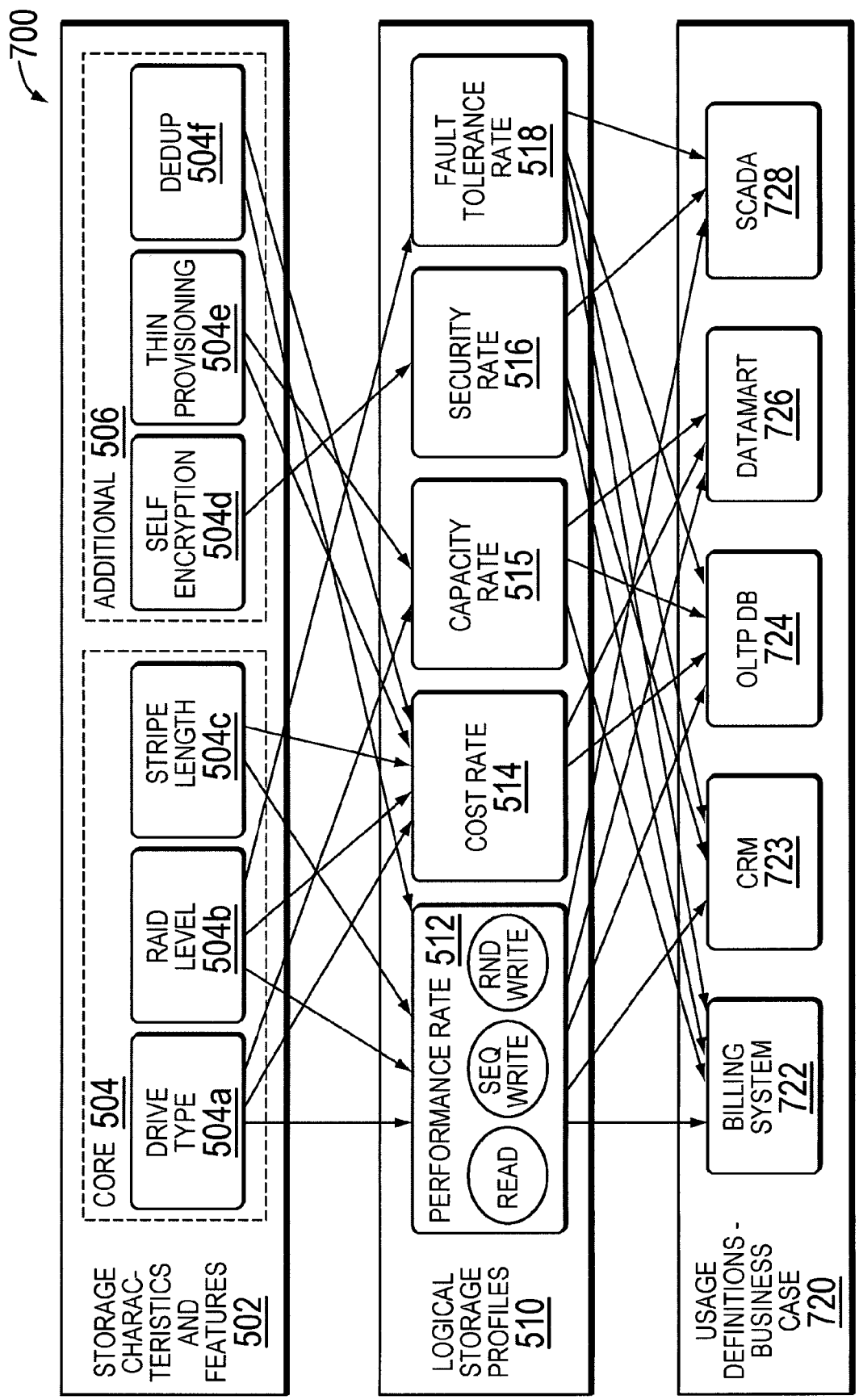

As with the example 500, the example 600 also includes arrows between various criteria 502 and rates of 510 and also between the rates of 510 and usage definitions of 620 illustrating dependencies or influences therebetween, With reference now to FIG. 10, shown is another example providing additional examples of different usage definitions that may be included in an embodiment in accordance with techniques herein. In the example 700, the characteristics and features 502 and various rates of 510 are as described in the example 500. In the example 700, different usage definitions 722, 724, 726 and 728 are illustrated where each usage definition of 720 may is based on a particular business use-case or application. For example, 722 is a usage definition for a billing system, 723 is a usage definition for a customer relationship management (CRM) system, 724 is a usage definition for an online transaction processing system for a database, 726 is a usage definition for a datamart business application, and 728 is a usage definition for a real time SCADA (supervisory control and data acquisition) system that monitors and controls industrial systems and processes (e.g., power generation, water treatment, and the like).

It should be noted that data mart is the access layer of the data warehouse data warehouse environment that is used to get data out to the users. The data mart is a subset of the data warehouse that is usually oriented to a specific business line or team. Data marts are small slices of the data warehouse. Whereas data warehouses have an enterprise-wide depth, the information in data marts pertains to a single department. In some deployments, each department or business unit is considered the owner of its data mart including all the hardware, software and data. This enables each department to use, manipulate and develop their data any way they see fit; without altering information inside other data marts or the data warehouse. In other deployments where conformed dimensions are used, this business unit ownership will not hold true for shared dimensions like customer, product, etc. The primary use for a data mart is business intelligence (BI) applications. BI is used to gather, store, access and analyze data. The data mart can be used by smaller businesses to utilize the data they have accumulated. A data mart can be less expensive than implementing a data warehouse, thus making it more practical for the small business.

Figure 11:
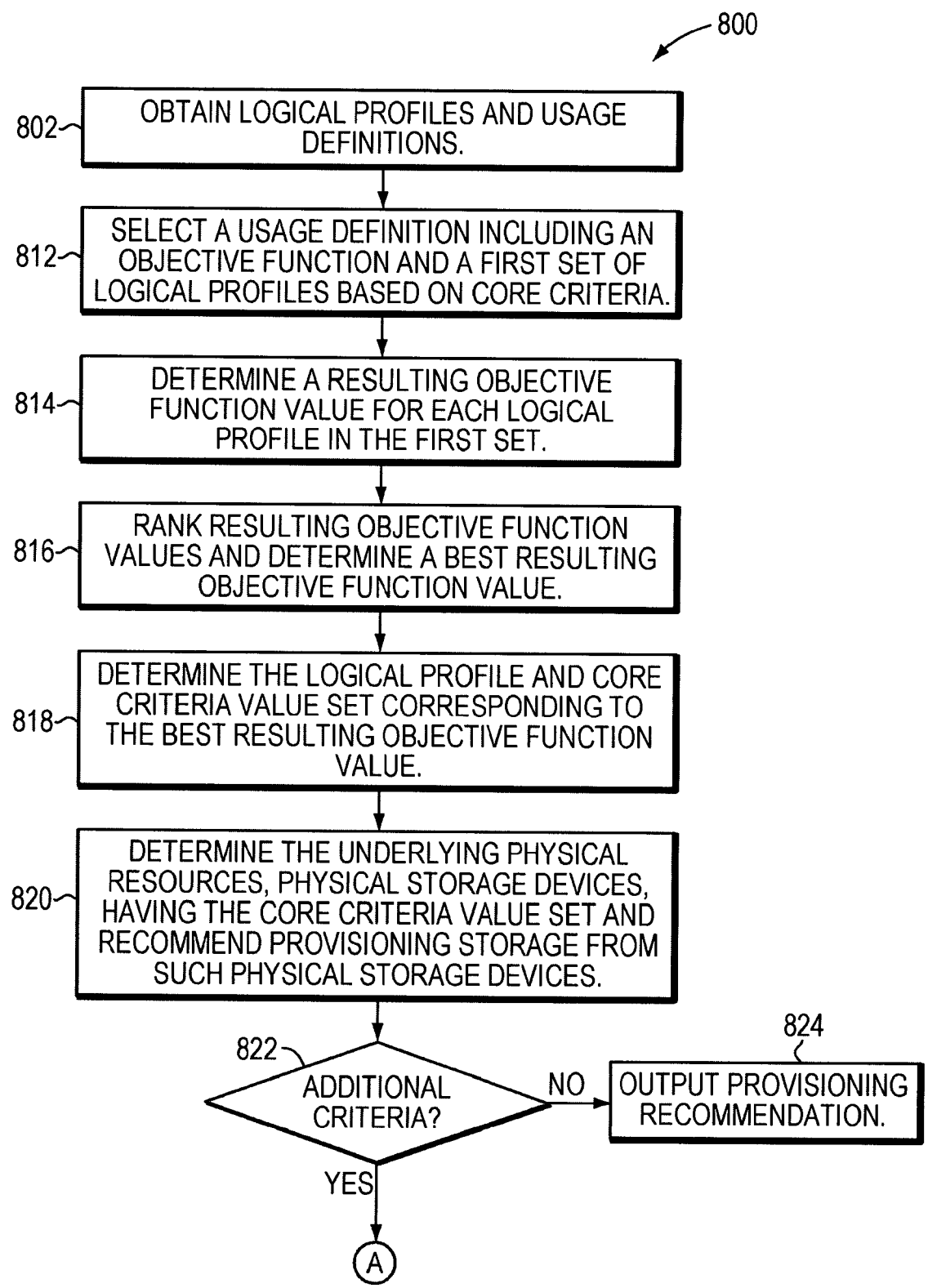
FIGS. 11 and 12 illustrate flowcharts of processing steps that may be performed in an embodiment in accordance with techniques herein.
Figure 12:
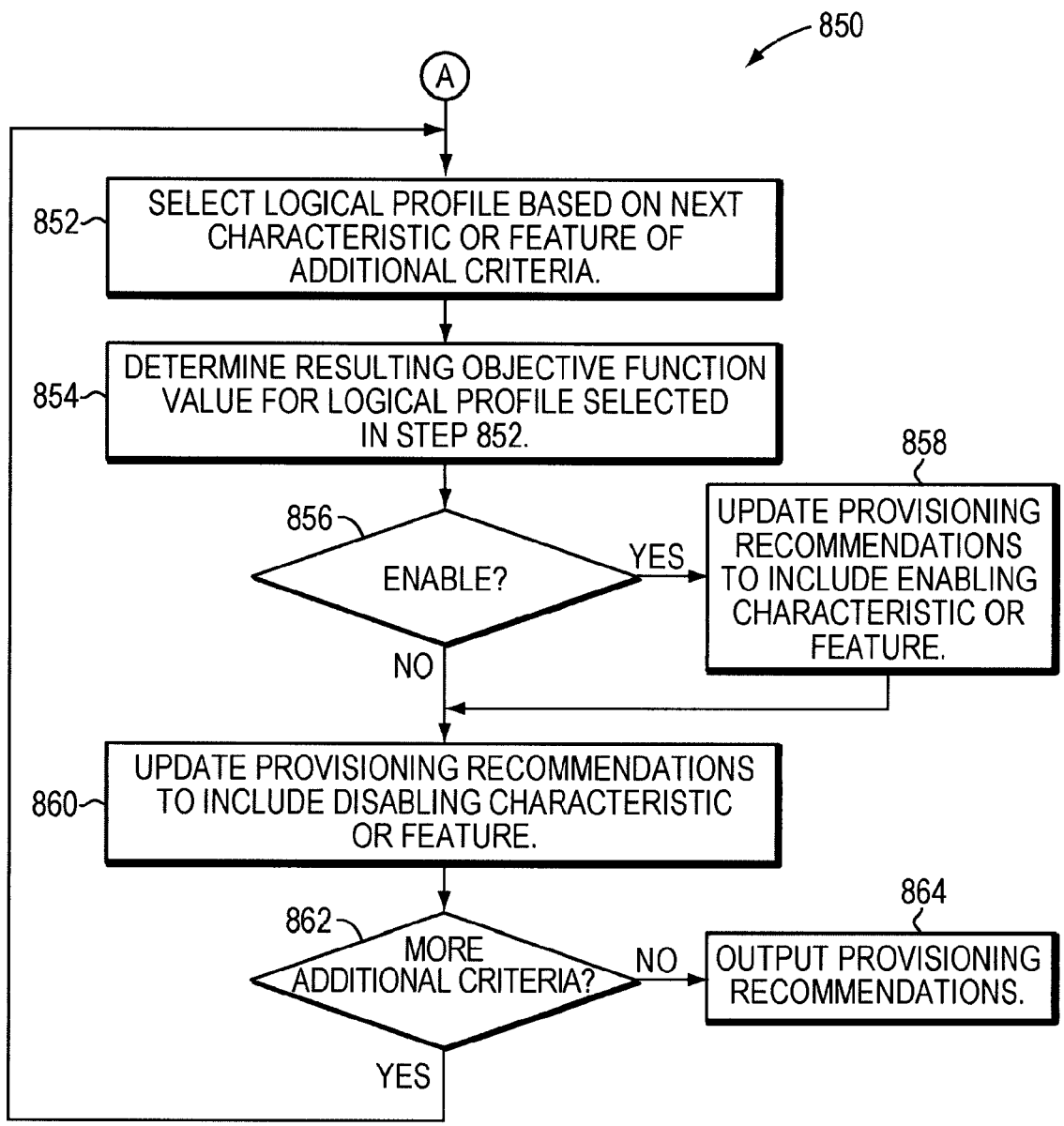

As with the example 500, the example 700 also includes arrows between various criteria 502 and rates of 510 and also between the rates of 510 and usage definitions of 720 illustrating dependencies or influences therebetween, Referring to FIGS. 11 and 12, shown are flowcharts of processing steps that may be performed in an embodiment in accordance with techniques herein. At step 802, logical profiles and one or more usage definitions may be obtained. At step 804, a usage definition and a first set of logical profiles based on core criteria are selected. It should be noted that the usage definition selected may correspond to a particular usage of storage to be provisioned, for example, for a logical device. A request may be received at the data storage system to provision storage for a logical device for a particular usage as characterized by the objective function in the selected usage definition.

The usage definition includes the objective function which is evaluated in step 814 for each logical profile in the first set. Step 814 determines a resulting objective function value for each logical profile in the first set. In step 816, the resulting objective function values are ranked and a best resulting objective function value is determined. The best resulting value may be the largest of all resulting objective function values determined in step 816 or the smallest of all resulting objective function values based on the particular objective function. At step 818, the logical profile of the first set and core criteria value set corresponding to the best resulting objective function value are determined. At step 820, the underlying physical resources, which are physical storage devices, having the core criteria value set are determined and provisioning recommendations are updated to indicate to recommend provisioning storage from such physical storage devices. At step 822, a determination is made as to whether additional criteria is specified. If step 822 evaluates to no, control proceeds to step 824 to output the provisioning recommendation. It should be noted that the provisioning recommendation may be in any suitable form. For example, an embodiment may simply output information regarding the core criteria value set corresponding to the logical profile having the best resulting objective function determined in step 818. As an alternative, an embodiment may output a ranked list of core criteria value sets corresponding to a portion of the ranked objective function resulting values, such as for the top N, N>0, resulting value. In this case, processing may also be performed to determine the logical profiles of the first set and core criteria value sets for the top N ranked resulting values.

If step 822 evaluates to yes, control proceeds to step 852 to commence processing of the additional criteria. At step 852, a logical profile is selected based on the next characteristic or feature of the additional criteria. At step 854, the resulting objective function value is determined for the logical profile selected in step 852. At step 856, a determination is made as to whether to enable the current characteristics or feature based on the resulting objective function value calculated in step 854. If step 854 evaluates to yes, control proceeds to step 858 to update provisioning recommendations to recommend enabling the current characteristic or feature and control proceeds to step 862. If step 854 evaluates to no, control proceeds to step 860 to update provisioning recommendation to recommend disabling the current characteristic or feature and control proceeds to step 862. At step 862, a determination is made as to whether there is any additional criteria remaining to be processed. If step 862 evaluates to no, control proceeds to step 864 to output the provisioning recommendations. If step 862 evaluates to yes, control proceeds to step 852 to process the feature or characteristic of the additional criteria.

It should be noted that the processing steps of 800 and 850 may output a provisioning recommendation such as to a user. At this point, the user may select to proceed with the provisioning based on the recommendation. Alternatively, an embodiment may automatically proceed with provisioning based on the recommendation without requiring further user interaction. The foregoing as well as other variations regarding when to proceed with automatically provisioning may vary with embodiment and data storage system policies.

It should be further appreciated from FIGS. 7A and 7B that steps 802 and 812 may also obtain and select a usage definition comprising a piecewise objective function in which case steps 814 to 862 may be repeated for each piece of the objective function.

An embodiment may implement the techniques herein using code executed by a processor. For example, an embodiment may implement the techniques herein using code which is executed by a processor of the data storage system, or more generally any other system. As will be appreciated by those skilled in the art, the code may be stored on the data storage system on a computer-readable storage medium (also referred to as a computer readable medium) having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

The invention claimed is:

1. A method for use in selecting resources for provisioning, the method comprising:
   selecting a usage definition and a first set of one or more logical profiles based on one or more core criteria, wherein said usage definition includes a piecewise objective function with each piece of the piecewise objective function characterizing distinct storage usage requirements, and wherein each of the logical profiles in the first set represents a resource set of one or more physical storage resources characterized by a core criteria value set that specifies one or more values for the one or more core criteria;
   determining a second and a third set of resulting objective function values by evaluating each respective piece of the objective function for each of the logical profiles in the first set, wherein each logical profile in the first set has a different corresponding resulting objective function value in the second and the third sets;
   selecting highest ranked objective function values in the second and the third sets, wherein the highest ranked objective function values in the second and the third sets have corresponding logical profiles in the first set and corresponding core criteria value sets; and determining a fourth set of physical storage resources characterized by the corresponding core criteria value sets for logical profiles, wherein the fourth set is any of recommended or selected for provisioning storage from the physical storage resources.

2. The method as claimed in claim 1, wherein the method further comprises:
provisioning the resources selected for provisioning in a heterogeneous pool.

3. The method as claimed in claim 1, wherein the piecewise objective function comprises two or more pieces with each piece characterizing distinct usage requirements.

4. The method as claimed in claim 1, wherein each piece of the piecewise objective function is expressed as a mathematical equation including a plurality of factors associated with a plurality of parameters, each of the plurality of factors being associated with a different one of the plurality of parameters, said each factor denoting a weight or level of importance of said different one of the plurality of parameters associated with said each factor.

5. The method as claimed in claim 4, wherein each of the logical profiles in the first set specifies a plurality of parameter values for the plurality of parameters thereby specifying a different one of the plurality of parameter values for each of the plurality of parameters.

6. The method as claimed in claim 1, wherein the usage definition characterizes usage for any of an application, policy, service level agreement, and business use-case.

7. The method as claimed in claim 6, wherein the usage definition specifies usage requirements or targets related to any of performance, cost, capacity, security, and fault tolerance.

8. The method as claimed in claim 1, wherein the method further comprises:
determining the amount of resources required to be selected or recommended by each piece of the piecewise objective function.

9. An apparatus for use in selecting resources for provisioning, wherein the apparatus comprises:
an interface;
memory; and
control circuitry coupled to the interface and memory, the memory storing instructions, which, when carried out by the control circuitry, cause the control circuitry to:
select a usage definition and a first set of one or more logical profiles based on one or more core criteria, wherein said usage definition includes a piecewise objective function with each piece of the piecewise objective function characterizing distinct storage usage requirements, and wherein each of the logical profiles in the first set represents a resource set of one or more physical storage resources characterized by a core criteria value set that specifies one or more values for the one or more core criteria;
determine a second and a third set of resulting objective function values by evaluating each respective piece of the objective function for each of the logical profiles in the first set, wherein each logical profile in the first set has a different corresponding resulting objective function value in the second and the third sets;
select highest ranked objective function values in the second and the third sets, wherein the highest ranked objective function values in the second and the third sets have corresponding logical profiles in the first set and corresponding core criteria value sets; and
determine a fourth set of physical storage resources characterized by the corresponding core criteria value sets for logical profiles, wherein the fourth set is any of recommended or selected for provisioning storage from the physical storage resources.

10. The apparatus as claimed in claim 9, wherein the instructions further cause the control circuitry to:
provisioning the resources selected for provisioning in a heterogeneous pool.

11. The apparatus as claimed in claim 9, wherein the piecewise objective function comprises two or more pieces with each piece characterizing distinct usage requirements.

12. A computer program product having a non-transitory computer readable storage medium which stores a set of instructions for use in selecting resources for provisioning, the set of instructions, when carried out by computerized circuitry, causing the computerized circuitry to perform a method of:
selecting a usage definition and a first set of one or more logical profiles based on one or more core criteria, wherein said usage definition includes a piecewise objective function with each piece of the piecewise objective function characterizing distinct storage usage requirements, and wherein each of the logical profiles in the first set represents a resource set of one or more physical storage resources characterized by a core criteria value set that specifies one or more values for the one or more core criteria;
determining a second and a third set of resulting objective function values by evaluating each respective piece of the objective function for each of the logical profiles in the first set, wherein each logical profile in the first set has a different corresponding resulting objective function value in the second and the third sets;
selecting highest ranked objective function values in the second and the third sets, wherein the highest ranked objective function values in the second and the third sets have corresponding logical profiles in the first set and corresponding core criteria value sets; and
determining a fourth set of physical storage resources characterized by the corresponding core criteria value sets for logical profiles, wherein the fourth set is any of recommended or selected for provisioning storage from the physical storage resources.

13. The computer program product as claimed in claim 12, wherein the instruction further cause the computerized circuitry to perform the method step of:
provisioning the resources selected for provisioning in a heterogeneous pool.

14. The computer program product as claimed in claim 12, wherein the piecewise objective function comprises two or more pieces with each piece characterizing distinct usage requirements.

* * * * *